US008776111B1

(12) United States Patent
Eldering et al.

(10) Patent No.: US 8,776,111 B1
(45) Date of Patent: Jul. 8, 2014

(54) METHODS AND SYSTEMS FOR GENERATING SUBSCRIBER USAGE PROFILES IN A MULTI-PLATFORM TARGETED ADVERTISING SYSTEM

(75) Inventors: Charles A. Eldering, Furlong, PA (US); Yang Yu, Swarthmore, PA (US)

(73) Assignee: Prime Research Alliance E, Inc. (VG)

( * ) Notice: Subject to any disclaimer, the term of this patent is extended or adjusted under 35 U.S.C. 154(b) by 1229 days.

(21) Appl. No.: 12/575,973

(22) Filed: Oct. 8, 2009

(51) Int. Cl.
  *H04N 7/025* (2006.01)
  *H04N 7/10* (2006.01)
  *G06Q 20/00* (2012.01)

(52) U.S. Cl.
  USPC .......... 725/34; 725/32; 705/14.49; 705/14.53

(58) Field of Classification Search
  USPC ........ 725/35; 705/14.49, 14.53, 14.52, 14.66, 705/14.67
  See application file for complete search history.

(56) References Cited

U.S. PATENT DOCUMENTS

| 7,103,370 | B1 | 9/2006 | Creemer |
| 7,539,742 | B2 | 5/2009 | Spector |
| 7,593,721 | B2 | 9/2009 | Ratnakar |
| 7,668,832 | B2 | 2/2010 | Yeh et al. |
| 7,729,945 | B1 | 6/2010 | Katz et al. |
| 2004/0147265 | A1* | 7/2004 | Kelley et al. ................. 455/445 |
| 2007/0244750 | A1* | 10/2007 | Grannan et al. ................ 705/14 |
| 2008/0167992 | A1 | 7/2008 | Kokernak et al. |
| 2009/0049469 | A1* | 2/2009 | Small et al. ...................... 725/35 |
| 2009/0292587 | A1* | 11/2009 | Fitzgerald ...................... 705/10 |
| 2010/0106769 | A1* | 4/2010 | Blanchard et al. ............. 709/203 |

OTHER PUBLICATIONS

Panos Kampanakis, Mike Kallitsis, Savitha Sridharan, & Professor Mike Devetsikiotis. "Triple Play—A survey," ECE776—Spring '06 Project. Electrical and Computer Engineering Department, North Carolina State University. (2006), 9pgs. Accessed at: <http://www4.ncsu.edu/~mgkallit/files/3PReportTechnical1.4.pdf>.

* cited by examiner

*Primary Examiner* — Sonia Gay
(74) *Attorney, Agent, or Firm* — The Belles Group, P.C.

(57) ABSTRACT

A method and system for creating a subscriber profile based on a subscriber's use of a multi-platform system capable of being accessed by a subscriber over a transmission medium includes a central computer sending a first data request to a first computer configured to monitor data transmitted over a first telecommunication platform. A second data request is sent by the central computer to a second computer configured to monitor data transmitted over a plurality of other telecommunication platforms. The central computer receives a first data log indicative of the subscriber's use of the first telecommunication platform and a second data log indicative of the subscriber's use of the other telecommunication platforms. A subscriber access pattern is detected by the central computer based on the first data log and the second data log. The central computer creates the subscriber profile using the detected subscriber access pattern.

17 Claims, 12 Drawing Sheets

METHODS AND SYSTEMS FOR GENERATING SUBSCRIBER USAGE PROFILES IN A MULTI-PLATFORM TARGETED ADVERTISING SYSTEM

CROSS REFERENCE TO RELATED APPLICATION

This application is related to co-pending U.S. patent application Ser. No. 12/575,927, filed Oct. 8, 2009, entitled Methods and Systems for Verifying Advertisements in a Multi-Platform Targeted Advertising System, U.S. patent application Ser. No. 12/575,945, filed Oct. 8, 2009, entitled Methods and Systems using a Multi-Platform Targeted Advertising System to Select Advertisements within a Target Geographic Area; and U.S. patent application Ser. No. 12/575,963, filed Oct. 8, 2009, entitled Methods and Systems for Generating Advertisement Triggers in a Multi-Platform Targeted Advertising System; the entire disclosures of which are incorporated herein by reference.

BRIEF DESCRIPTION OF THE DRAWINGS

The following detailed description will be better understood when read in conjunction with the appended drawings, in which there is shown one or more of the multiple embodiments of the present disclosure. It should be understood, however, that the various embodiments of the present disclosure are not limited to the precise arrangements and instrumentalities shown in the drawings.

In the Drawings.

DETAILED DESCRIPTION

Figure 1:
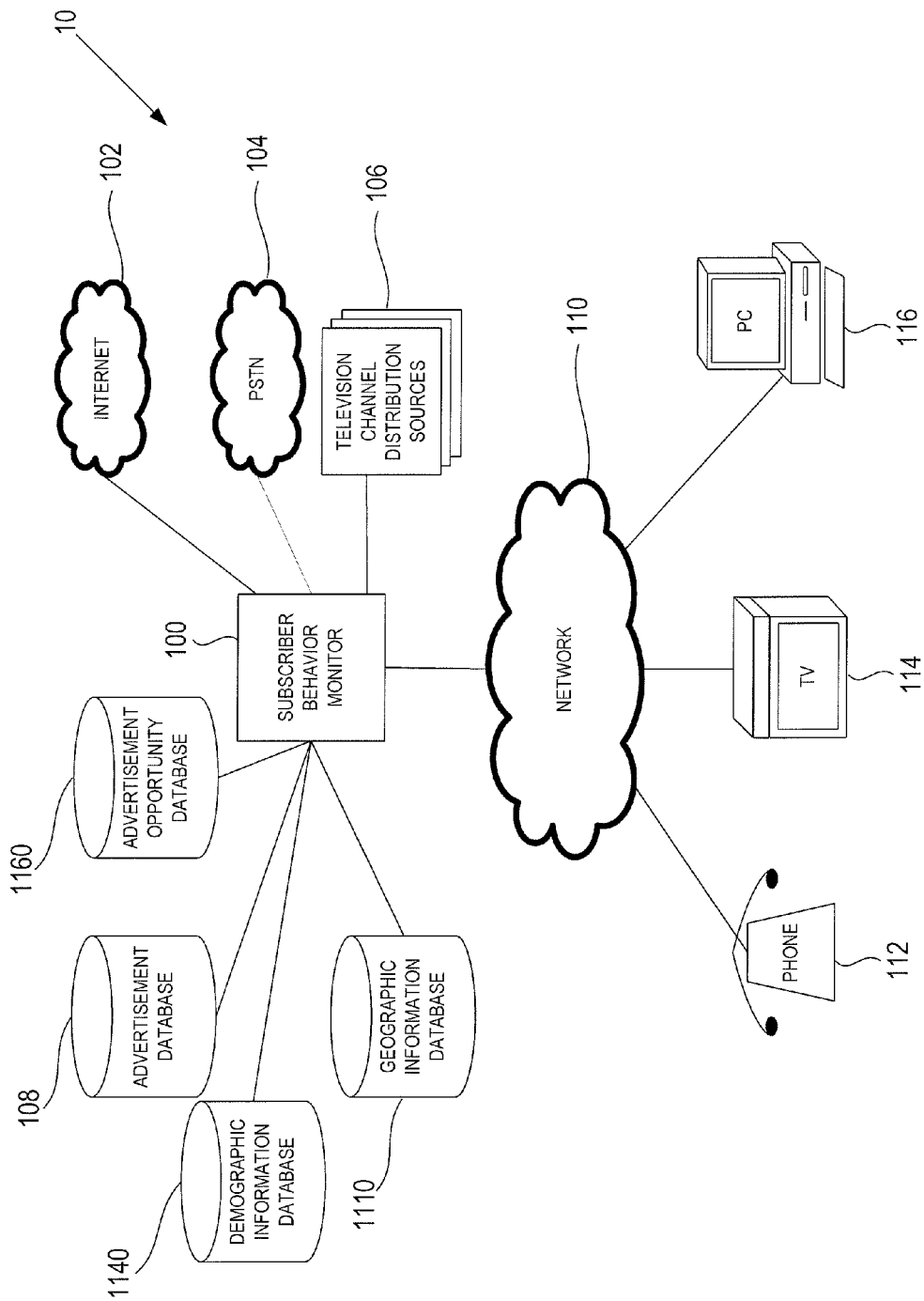
FIG. 1 is a system diagram of a multi-platform targeted advertising system according to one embodiment of the present disclosure.

Certain terminology is used herein for convenience only and is not to be taken as a limitation on the embodiments of the present disclosure. In the drawings, the same reference letters are employed for designating the same elements throughout the several figures.

Unified Modeling Language ("UML") can be used to model and/or describe methods and systems and provide the basis for better understanding their functionality and internal operation as well as describing interfaces with external components, systems and people using standardized notation. When used herein, UML diagrams including, but not limited to, use case diagrams, class diagrams and activity diagrams, are meant to serve as an aid in describing the embodiments of the present disclosure, but do not constrain implementation thereof to any particular hardware or software embodiments.

The present disclosure relates to multi-platform communication systems. As used herein, the term "platform" refers to the hardware architecture and associated software framework required to offer a communication service over a transmission medium. For example, a multi-platform system often referred to as "Triple Play" includes three platforms: an Internet platform, a television platform, and a telephone platform, enabling delivery of a bundle of services, including Internet access, television connectivity and telephone connectivity over the same medium. Examples of items included in a platform include, without limitation, a router, a modem, computer architecture, an operating system, runtime libraries, and a graphical user interface. For example, a telephone platform in a multi-platform system may include a telephone, a Voice over Internet Protocol (VoIP) router, and associated software. It should be noted that the multi-platform systems of the present disclosure encompass multi-platform systems which may include any number of platforms greater than one.

The multi-platform systems of the present disclosure are each associated with one or more subscribers. As used herein, the term subscriber refers to any user of or viewer in a multi-platform system or a group of such persons. Thus, there may be multiple subscribers in a household or community or an entire household may be treated as a single subscriber. Each subscriber may be associated with one or more devices. Devices may also be shared among subscribers. It should be noted that that a user only needs to utilize one platform in the multi-platform system to be considered a subscriber. For example, a user may be a subscriber to a bundle of communication services (such as Triple Play) even if the person only utilizes the telephone platform.

As used herein, a "session" refers to a time period during which a subscriber uses a platform in the multi-platform system. Note that a subscriber may be engaging in multiple sessions simultaneously. For example, a subscriber who surfs the Internet while listening to television for an hour has engaged in a one-hour session on both the Internet platform and the television platform. A subscriber's usage pattern may be described by a group of sessions. Thus, for example, if a subscriber surfs the Internet for one hour each day for a month, the subscriber may be characterized as having a daily Internet platform usage of one hour.

FIG. 1 illustrates an exemplary system 10 that tracks subscriber access to a Triple Play system. A Subscriber Behavior Monitor (SBM) 100 monitors subscriber usage of Internet service, telephone service, and television service. The SBM 100 is able to monitor this usage because of its placement as an intermediary between subscriber devices 112, 114, 116 and the Internet 102, PSTN 104, and the television distribution source 106. Thus, for example if the user makes a request for a file located on the Internet 102, the request must, at a minimum, pass though the SBM 100 on route to its destination.

Continuing with reference to FIG. 1, the subscriber utilizes multiple access devices 112, 114, 116 to access Internet, telephone, and television service. Each access device 112, 114, 116 connects with the SBM 100 over a network 110. The network 110 may be any network or system generally known in the art, including the Internet, an intranet, a local area network (LAN), a wide area network (WAN), a metropolitan area network (MAN), a direct connection or series of connections, a cable television infrastructure, a cellular telephone network or any other network, transmission channel or medium capable of facilitating communication between the devices, modules and other components of the SBM 100, as well as between access devices 112, 114, and 116 and the SBM 100. The network may be wired, wireless or a combination thereof. Wired connections may be implemented using Ethernet, Universal Serial Bus (USB), RJ-11 or any other wired connection generally known in the art. Wireless connections may be implemented using wife, wimax, bluetooth, infrared, cellular networks, satellite or any other wireless connection methodology generally known in the art. The network may be implemented in a client-server, token-ring, peer-to-peer manner or any other network topology known in the art. Additionally, several networks may work alone or in communication with each other to facilitate communication in the network 110. Various networking standards may be employed for allowing each access device 112, 114, 116 and the SBM 100 to communicate with the network 110, such as EDGE, 3G and/or 802.11.

The SBM 100 tracks platform usage by the devices 112, 114, 116. The tracked information is used to select one or more advertisements from a database 108 connected to the SBM 100. In addition, the system 10 of FIG. 1 includes three other databases that interact with the SBM 100: the Geographic Information Database 1110, the Demographic Information Database 1140, and the Advertisement Opportunity Database 1160. As will be explained below, each of the databases 1110, 1140, 1160 provide the SBM 100 with information to permit tasks such as subscriber profiling, market segmentation, and advertisement opportunity detection. The main component of this system, the SBM 100, is also described in more detail in the remainder of this disclosure.

Figure 2:
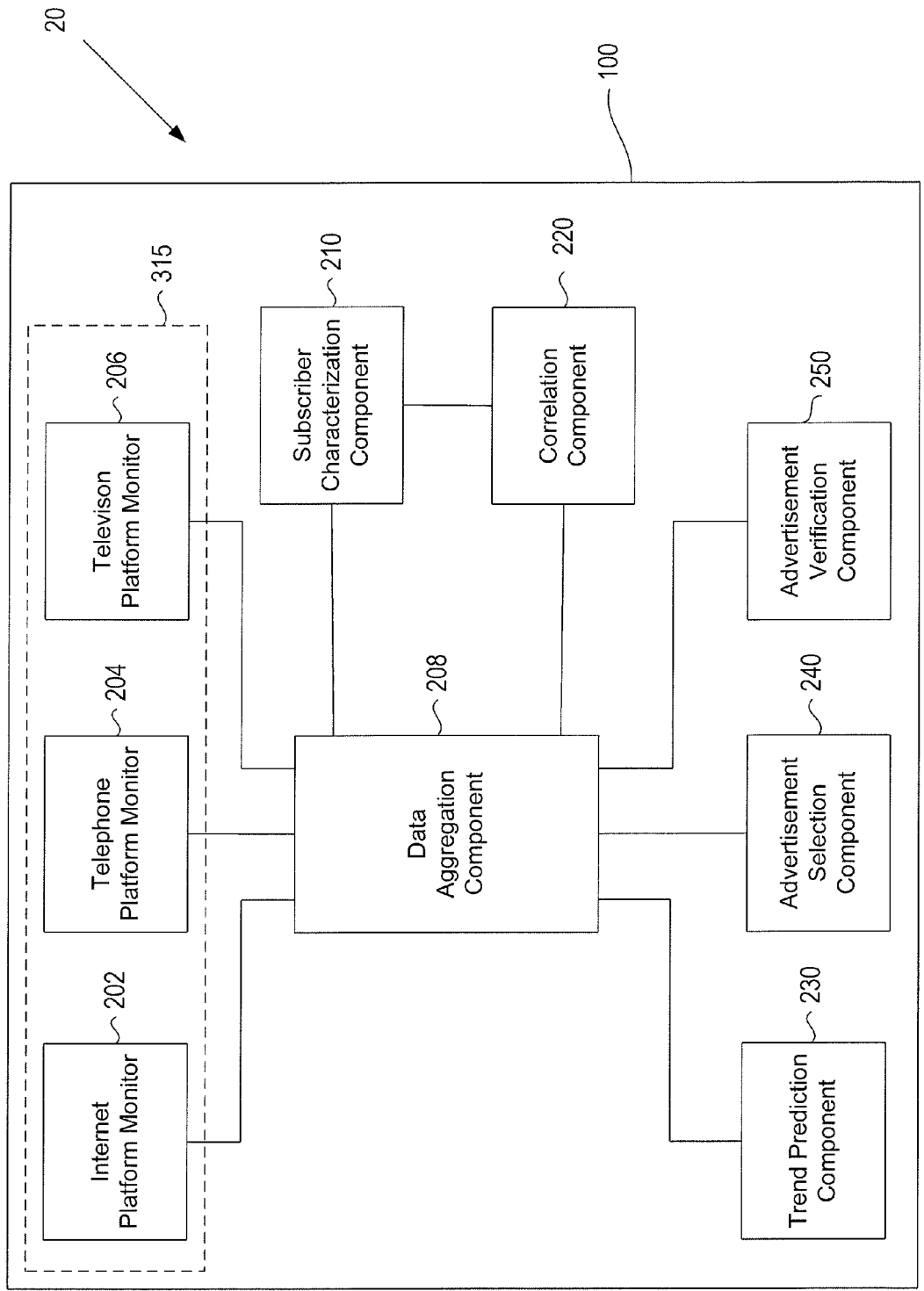
FIG. 2 is a system diagram of a multi-platform subscriber behavior monitor system according to one embodiment of the present disclosure.

In FIG. 2, one embodiment 20 of the SBM 100 is illustrated. The SBM 100 in this embodiment is configured to monitor access to a Triple Play system. One skilled in the art would understand other configurations are possible to support the triple-play system or another multi-platform system.

Each platform is associated with a platform monitoring component 202, 204, 206, which monitors the subscriber usage of a specific platform over one or more sessions. Thus, for example, the Internet Platform Monitor 202 will monitor and gather information during each Internet usage session. Throughout this disclosure, these platforms are referred to either individually or collectively as the "platform monitors" 315.

Figure 3:
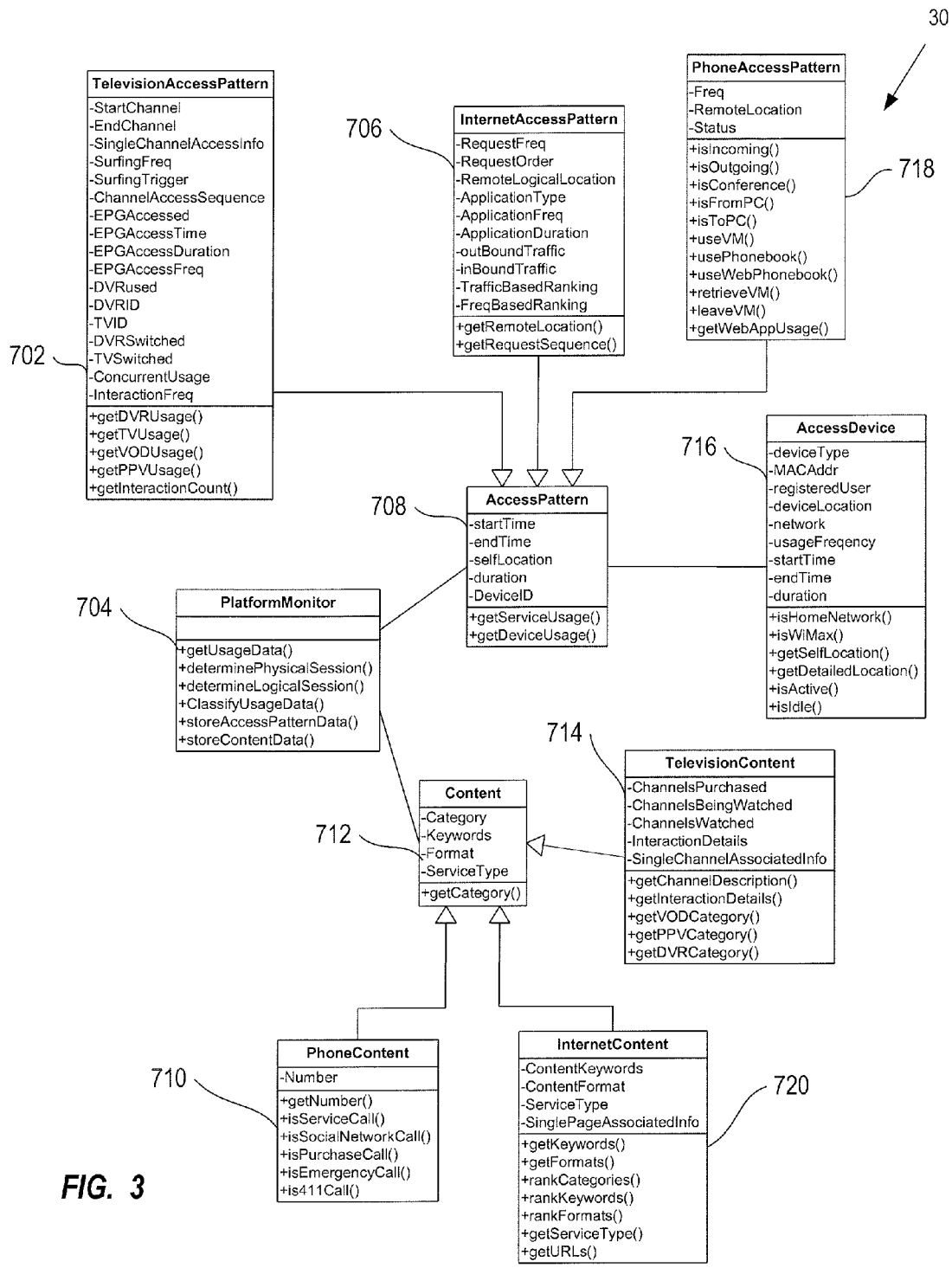
FIG. 3 is a class diagram of a group of classes utilized by a subscriber behavior monitor system according to one embodiment of the present disclosure.

FIG. 3 provides a UML class diagram illustrating various classes associated with each Platform Monitor Component 202, 204, 206. These classes show one potential implementation of the functionality associated with the Platform Monitor Components 202, 204, 206. One skilled in the art would understand that other implementations are possible. Also note that, although FIG. 3 suggests an object-oriented design of the system, the Platform Monitor Components 202, 204, 206 may be implemented using other design techniques.

In FIG. 3, an object diagram illustrating one embodiment 30 of the SBM is illustrated. Objects derived from the PlatformMonitor class 704 are assigned the task of monitoring a specific platform. Each PlatformMonitor object is associated with one object derived from the AccessPattern class 708 and one object derived from the Content class 712. Session information gathered by a Platform Monitor object is distributed to each of these associated objects for further processing. The Platform Monitor class 704 also provides an interface for other components of the SBM 100 to access monitored data. For example, the Correlation Component 220 contacts each platform monitor to retrieve recorded and derived session data.

The AccessPattern class 708 tracks and analyzes the habits that the subscriber exhibits while interacting with one or more platforms. The AccessPattern class 708 may be used directly by a PlatformMonitor object. In addition, as shown in FIG. 3, the AccessPattern class 708 may serve as a parent class for one or more platform specific child classes 702, 706, 718. These child classes provide more specificity in the usage information recorded during each access. For example, an object derived from the PhoneAccessPattern class 718 may record information including, without limitation, the start and end time of the telephone call, the duration of the call, the location where the phone access was made, whether the access resulted from an incoming or outgoing phone call, whether the access was from a computer or traditional phone device, whether a phone book was employed during the access, whether voice mail was used during the access, and whether the access was for a conference call.

The information stored in an AccessPattern object is based on observations of the subscriber's behaviors. For example, a subscriber may only access certain content on a particular day and at a particular time. Information may also be derived from the manner that the subscriber interacts with the multiplatform system. In one embodiment, this includes gestures and interactions that the subscriber makes to interact with each platform. For example, if the device is associated with an accelerometer, the device's orientation and movement may be tracked by an AccessPattern object. This information may allow the SBM to accurately profile a user and provide advertisements to the user. If the SBM detects that the subscriber is very active in using the device, it may select a game-type advertisement that comprises an interactive game that responds to high rates of activity.

An object derived from the AccessPattern class 708 is associated with one or more objects derived from the AccessDevice class 716. These objects describe the device that a subscriber uses to access a particular platform. An access device is defined as any device included in the multi-platform system. For example, appropriate devices for the Internet platform include, without limitation, a personal data assistant (PDA), a smart phone, a media player, a portable gaming device, a set-top box, a gaming box, a desktop computer, and a notebook computer. In should be noted that an access device may be used to access multiple services. For example, a smart phone may enable the subscriber to access both the Internet service and the telephone service.

The AccessDevice 716 class may include, but is not limited to, several variables which describe the hardware and firmware associated with an access device. For example, with reference to the implementation illustrated in FIG. 3, the deviceType provides a description of the device type (e.g., smart phone). Other variables may provide, without limitation, addressing information, accelerometer data, display capabilities, networking functionality, available memory, and keypad design.

In one embodiment, a device location variable in each AccessDevice object stores the current location of the access device. This location may be determined using any technique known in the art. Examples of appropriate techniques include, without limitation, cell tower triangulation, GPS recognition, and RFID tracking. This information will allow the system to accurately correlate platform usage with a subscriber's location. For example, a subscriber may use the Internet platform to access certain websites while traveling to work on a commuter train. A network variable inside the AccessDevice class 307 provides more specificity to indicate how the subscriber accesses content when in a particular location (e.g., via free WiFi offered on the commuter train). By intelligently monitoring this information, the system could more accurately profile subscriber platform access behavior.

Location information stored in an object derived from the AccessDevice class 716 will also enhance the delivery of advertisements to subscribers. In one embodiment, the SBM 100 can distinguish between a plurality of household members based on platform and access device usage habits. Thus, for example, if there are multiple computers in a household, the SBM 100 can select a computer for delivery of particular advertisement based on the usage of each computer in the household. Moreover, by correlating location data from multiple platforms, the SBM can provide a more accurate subscriber usage profile to enhance advertisement selection and delivery. For example, the system may determine that a computer is located near a television, each device is accessed at approximately the same time each day, and the content accessed on each device is similar in type. Based on this information, the system may determine that the same user is operating each device and an advertisement may be targeted to the user utilizing the Internet platform, the television platform, or both platforms in combination.

Other variables in the AccessDevice class 716 record the time periods during which the device is used by the subscriber. A start time and end time variable indicate the time of day that the subscriber begins and ends using the device, respectfully. Time may be stored in any format known in the art and the variable may further include an indication of the day of week that the subscriber uses the device. This may be useful, for example, to indicate that the subscriber only uses a certain device on weekdays. In addition a variable in the AccessDevice class 716 stores the number of times that a device is used to access a particular platform. This variable may, for example, help the SBM 100 to select a preferred device for advertisement delivery in the event that multiple delivery options are available.

Each PlatformMonitor object is also associated with an object derived from the Content class 712. The Content class 712 records information about the type of content accessed over a particular platform. As with the AccessPattern class 708, the Content class 712 may be used directly or it may also serve as a parent class for one or more child classes. In FIG. 3, each platform in the Triple Play system is associated with a specific and unique child class 702, 706, 718. For example, the child class associated with the television platform 702 includes variables describing, without limitation, the channels purchased by the subscriber, the channels watched by the subscriber in the past, the channels currently being watched by the subscriber, and the number of interactions between the subscriber and a television platform access device (e.g., a set-top box). The class may further include information detailing the frequency of use for services such as digital video recording (DVR), video-on-demand (VOD), and pay-per-view.

In one embodiment, variables in the Content class 712 record the general category of the content (e.g., sports), keywords associated with the content, the format of the content (e.g., a flash movie), and the service type connected with the content. Other variables may be included to provide more specificity of the type of content accessed by the subscriber. For example, a user of the Internet platform may routinely request download of a news site and then request download of a sports website. The Content class 712 may record the page file type (e.g., HTML), its general category (e.g., sports), one or more subcategories (e.g., basketball), and keywords associated with page. Using this information, subscriber content access patterns may be more accurately determined.

Using the information gathered by the Platform Monitors, 202, 204, 206, a Correlation Component 220 develops cross-platform correlations to provide an indication of how access patterns and content types are related across platforms. For example, there may be a strong positive correlation between the number of Internet accesses to a sports related web page and the number of phone calls to a fast food restaurant. This correlation may be refined even further by considering the number of sports-related television programs viewed by a subscriber. In addition, factors such as the number of accesses at a particular time or geographic access location may be taken into account. It should be noted that the Correlation Component 220 may also find negative correlations. A negative correlation may be useful, for example, to select an optimal advertisement for a particular subscriber by eliminating those advertisements that are likely to be ineffective.

To fully take advantage of the benefits of the multi-platform system, the Correlation Component 220 correlates access pattern, content types, and other related information across each platform in the system. Such information will enable the system to provide a better indication of how the subscriber utilizes the multiple platforms in conjunction with one another. For example, a subscriber may routinely surf the Internet while listening to television in the background. In this situation, it may be desirable to present the subscriber with an advertisement over the television that promotes a website.

The Subscriber Characterization Component 210 characterizes a subscriber based on usage of the multi-platform system. The characterization may include any information that describes the subscriber. In one embodiment, for example, the system generates a demographic description of the subscriber, describing a probable age, income, gender and other demographic indicators. The resulting characterization includes probabilistic determinations of a subscriber's service preferences. For example, with regard to the television platform, the Subscriber Characterization Component 210 may determine what other programming or products the subscriber will be interested in viewing.

In one embodiment, the characterization generated by the Subscriber Characterization Component 210 takes two forms. First, a subscriber may be characterized based on the type of content that is accessed over the multi-platform system. For example, a user who watches many sporting events on television may be characterized as a sports fan. Thus, this first type of characterization describes "what" content the subscriber has accessed. This may be contrasted with the second type of subscriber characterization: access characterization. With access characterization, "how" the subscriber is accessing content is described. To build on the previous example, subscriber habits may indicate that the subscriber only watches sporting events on Sundays during the afternoon. By utilizing both content characterization and access characterization, advertising selection, presentment, and verification techniques may be enhanced. For example, the characterizations may be used to place the subscriber in a particular market segment or to target a specific advertisement to the subscriber. Both content type characterization and access characterization can be enhanced by collecting information from multiple platforms. For example, in a Triple Play system, a subscriber may be characterized based on the type of websites that are browsed on the Internet platform, the types of businesses called on the telephone platform, and the type of programs watched on the television platform. By considering more information about the subscriber habits, the accuracy of advertisement selection, presentment, and verification will be increased.

In one embodiment, the Subscriber Characterization Component 210 generates characterizations at the household level. These characterizations provide an aggregate representation of the platform usage habits of each member of a particular household. This information may be used to select advertisements at the household level (e.g., direct mail). The household characterization may also be utilized to provide a "default" characterization for the multi-platform system that may be employed when the system can not detect which household member is using the platform. For example, a household characterization may indicate that a household of four persons collectively have a particular political viewpoint. Thus, an advertisement may still be selected based on platform usage even if the individual subscriber-specific usage patterns are not available. The Subscriber Characterization Component 210 may also develop community-based characterizations to describe the platform usage patterns exhibited by a group of households. This granularity of the characterization may also aid in selecting the optimal form of advertising. For example, a neighborhood-based characterization may be relevant in selecting content for a billboard located along a highway near the neighborhood.

Figure 4:
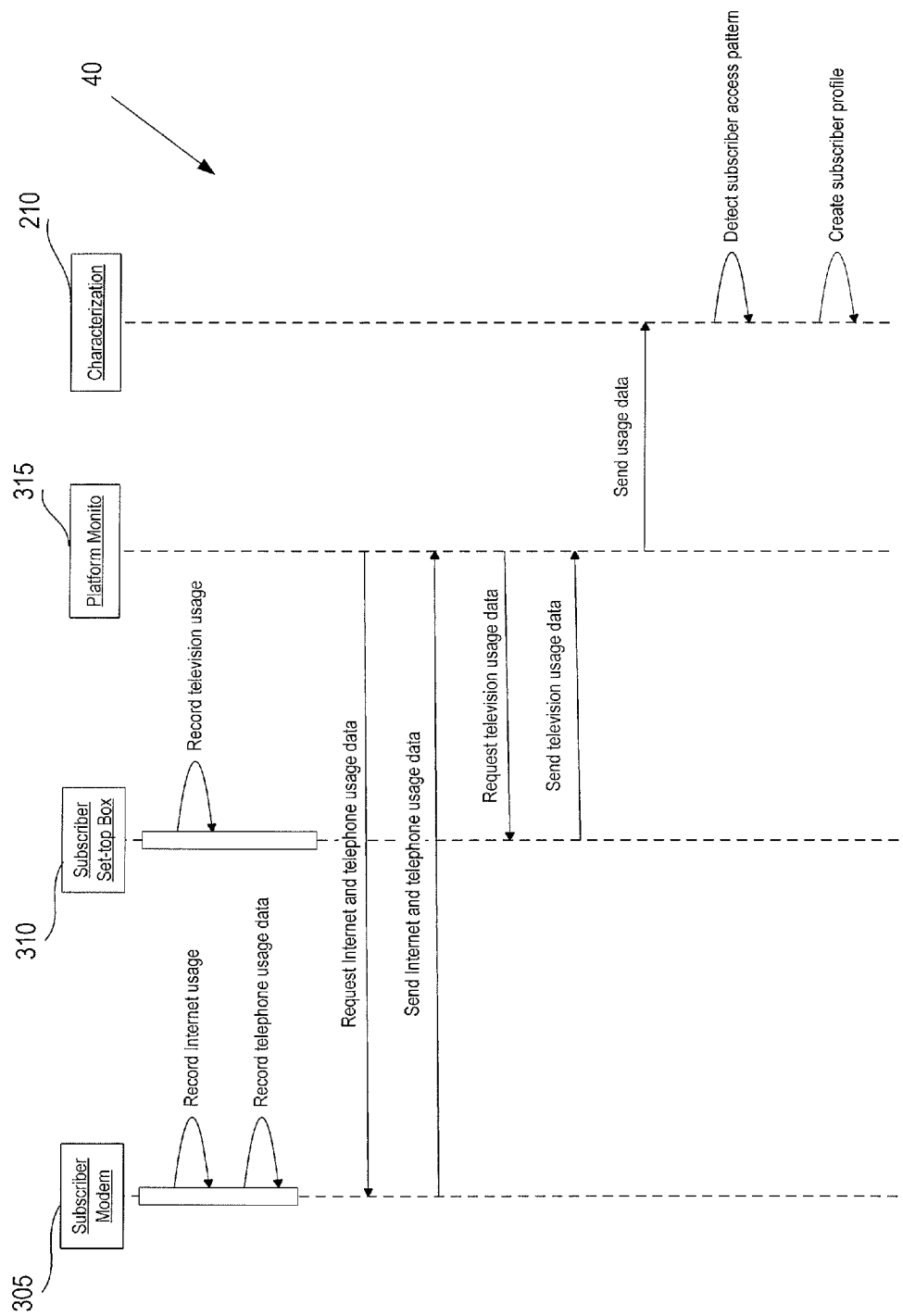
FIG. 4 is a sequence diagram illustrating an exemplary process of creating a subscriber profile based on a subscriber's use of an Internet platform and a telephone platform.

FIG. 4 illustrates an exemplary embodiment 40 for creating a subscriber profile. In this embodiment, the SBM interacts with two subscriber platform computers: a subscriber modem 305 and a subscriber set-top box 310. The subscriber modem 305 provides Internet and telephone usage to the subscriber. In addition, this modem 305 records Internet usage data and telephone usage data. The modem 305 may record this usage data locally if storage is available internal to the subscriber modem device 305. Alternatively, the subscriber modem 305 may be coupled to external storage such as a hard drive on a desktop computer to permit storage of usage data. The subscriber set-top box 310 provides television usage to the subscriber and records any subscriber usage of the television platform 206. The platform monitors 315 retrieve Internet and telephone usage data from the subscriber modem 305. The monitors 315 also retrieve television usage data from the subscriber set-top box 310. All of the collected usage data is then sent to the Subscriber Characterization Component 210 which detects access patterns in the usage data and creates subscriber profiles based on those access patterns.

Figure 5:
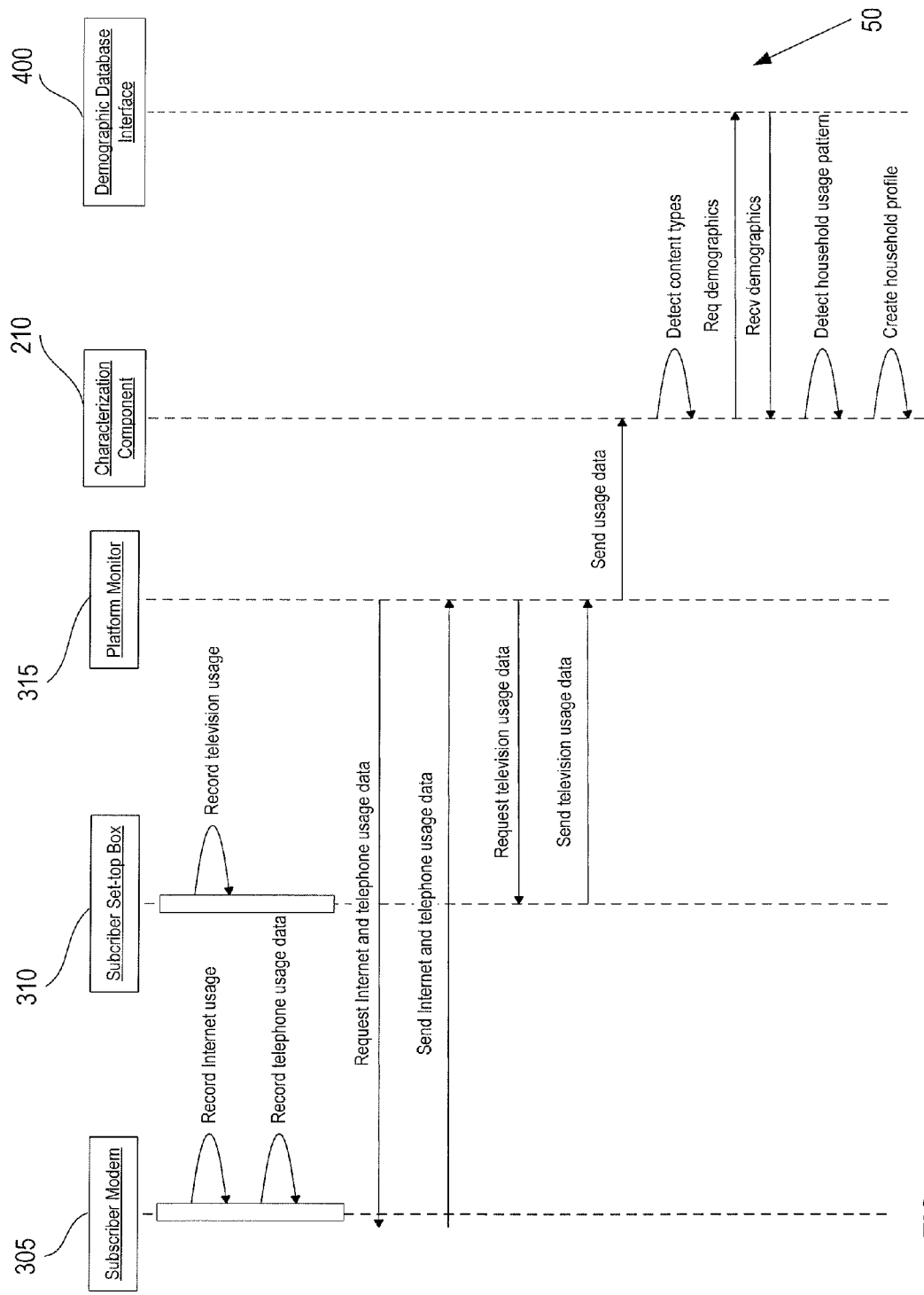
FIG. 5 is a sequence diagram illustrating an exemplary process of creating a household profile based on a household's use of an Internet platform and a telephone platform.

FIG. 5 provides an illustration on an embodiment 50 where a household profile is generated using data contained in the demographic information database 1140. As with the embodiment 40 illustrated in FIG. 4, the Platform Monitors 315 communicate with the subscriber modem 305 and subscriber set-top box 310 to retrieve usage data. Rather than analyze the data for access patterns as in FIG. 4, however, in FIG. 5 the Characterization Component 210 analyzes the data to detect one or more content types contained in the data. Based on these content types, the Characterization Component 210 retrieves demographic data from the demographic database through an interface 400 associated with the database. Based on this demographic data, the Characterization Component 210 detects household usage patterns. The household usage patterns are then used to create a household profile.

In some embodiments, the Characterization Component 210 uses market segmentation techniques to place subscribers into market segments. These market segments can later be used by the Characterization Component, or another component of the SBM 100 to, for example, select content for presentation to the subscriber, provide more accurate subscriber profiles, or to create group advertising opportunities for subscribers. It should be noted that the Characterization Component 210 may utilize known market segments (e.g., "baby-boomer") or it may create complex market segments based on existing subscriber information and use of the multi-platform system. For example, the Characterization Component 210 may create a market segment comprising baby-boomers that live in the Philadelphia area, have large families, visit sports related websites, and watch reality television programming.

The Characterization Component 210 may segment subscribers based on one or more variables that may be known or derived from existing subscriber information. In one embodiment, for example, geographic variables are used to segment a subscriber. These may comprise, for example, the region in which the subscriber lives (including the continent, country, state, and neighborhood), the size of the population in that region, the population density in the region, and the weather patterns common to the region. In another embodiment, demographic segmentation techniques are used and the Characterization Component 210 variables such as, for example, age, gender, height, weight, family size, generation (e.g., baby boomer), income, occupation, education, ethnicity, nationality, and religion.

The Characterization Component 210 may also segment subscribers based on the subscriber's use of the multi-platform system. In one embodiment, the Characterization Component 210 uses Psychographic Segmentation to segment subscribers based on personality, values, attitudes, interests, or lifestyle. In another embodiment, the Characterization Component uses Behavioristic Segmentation techniques to place the subscriber into a market segment based on the subscriber's knowledge of, and behavior towards, a particular product. Variables used during this form of segmentation may include, without limitation, the benefits sought from a particular product, the usage rate of that product, how loyal the subscriber is to the provider of that product, and how ready the buyer is to make another purchase of that product. These variables may be gathered, for example, by monitoring how a subscriber reacts to the presentation of a series of advertisements for a particular product.

Figure 6:
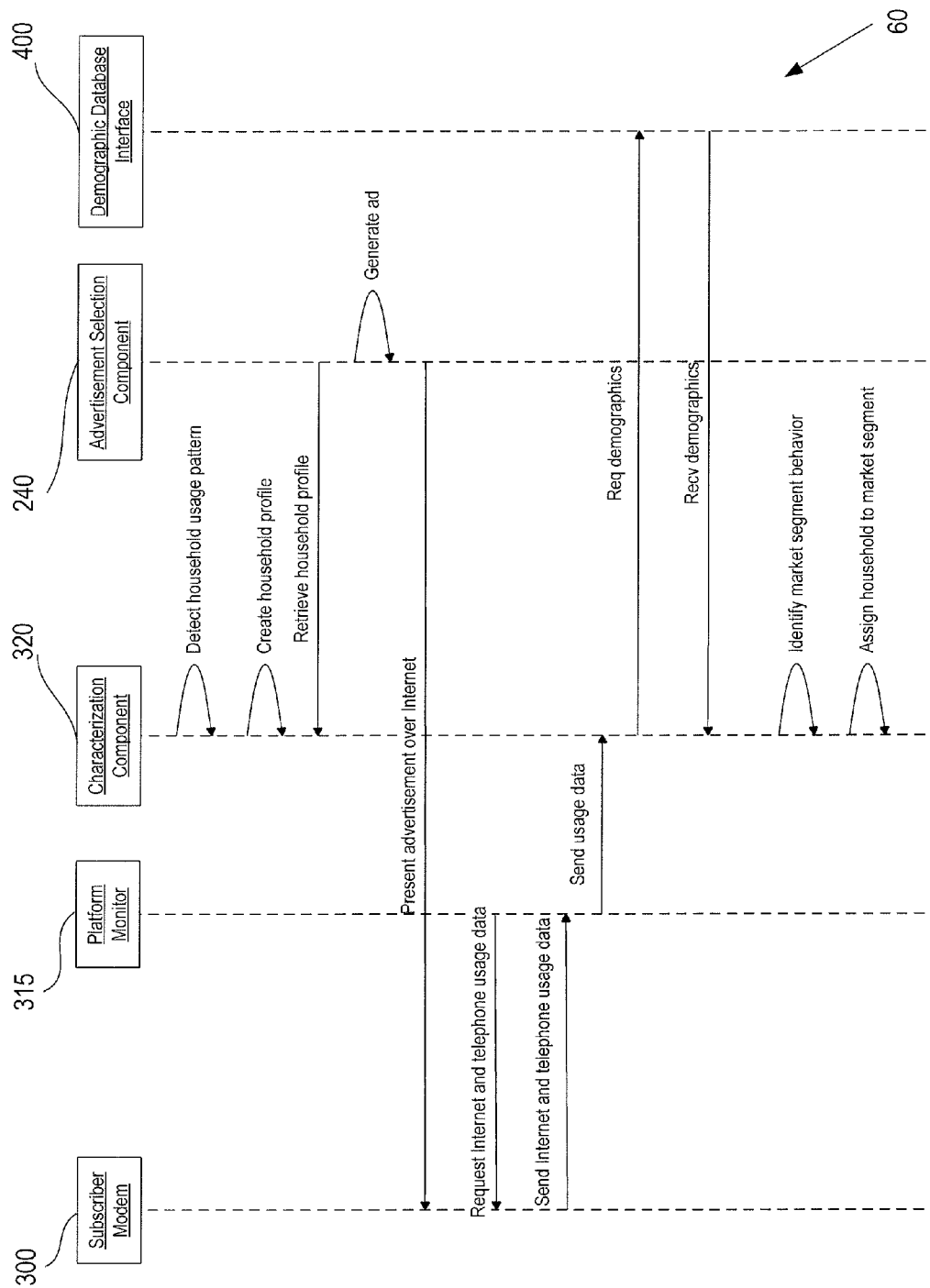
FIG. 6 is a sequence diagram illustrating an exemplary process of assigning a household to a market segment based on the household's Internet platform usage and telephone platform usage.

FIG. 6 presents an exemplary embodiment of how a household can be assigned to a market segment based on advertisement responses. The Advertisement Selection Component retrieves a subscriber household profile from the Subscriber Characterization Component 210. Based on this profile, the Advertisement Selection Component 240 generates an advertisement and presents it over the Internet platform to the subscriber via the Subscriber Modem 300. Next, the Platform Monitors 315 retrieve the Internet usage data and send it to the Characterization Component 320. Based on the usage data, the Characterization Component retrieves demographic information from the Demographic Database via an interface 400 associated with the database. Then, the Characterization Component 320 identifies one or more market segments based on the usage data and the demographic data. Finally, the Characterization Component 320 assigns the household to the identified market segment or market segments.

A Trend Prediction Component 230 predicts trends in the subscriber's use of the multi-platform system. Data is gathered from the subscriber's use of each platform. For example, in one embodiment, the Trend Prediction Component 230 forecasts future subscriber behavior of the Internet platform including, without limitation, the next URL that will be accessed over the Internet platform, the next channel that will be accessed over the television platform, when the user will change the channel on the television platform, and how long the subscriber will view and use each platform. Using the predictions generated by the Trend Prediction Component 230, the Advertisement Selection Component 240 can propose content to offer to the subscriber. In one exemplary embodiment, a prediction is used to recommend content over an electronic program guide (EPG) used on the television platform. In this embodiment, the system also recommends video on demand content based on the subscriber's access of video content over the Internet platform. The Trend Prediction Component 230 may also operate at the community or household level, clustering and analyzing a subscriber's behavior based on the behavior of other subscribers of the multi-platform system.

An Advertisement Selection Component 240 selects one or more advertisements from the Advertisement database 108 based on the subscriber characterization derived by the Subscriber Characterization component 210. An advertisement may be selected directly based on the characterization, or the subscriber may first be placed in a market segment based on characterization information. The Advertisement Selection Component 240 uses the market segment to provide a demographic representation of the subscriber which can be used to categorize the subscriber for advertising purposes. For example, the subscriber's usage habits on the multi-platform system may indicate the subscriber is very wealthy. This information could then be used to select the subscriber advertisements for expensive cars. Subscribers may also be clustered in to market segments at the household or community level.

The Advertisement Selection Component 240 may choose any advertisement suitable for delivery over the targeted platform. For example, on the Internet platform, potential advertisements include, without limitation, banner advertisements, rich media advertisements, interstitial advertisements, keyword search advertisements, and pop-up advertisements. Each platform may have one or advertising types unique to that platform and there may be advertisement types that are utilized on multiple platforms.

The SBM 100 may also track usage patterns to determine the optimal time to present the subscriber with the advertisement. For example, if the SBM determines that the subscriber's household usually orders pizza on Thursday nights, corresponding advertisements may be presented on Wednesday and Thursday. The SBM 100 may also select advertisements from different vendors to avoid subscriber saturation.

In some embodiments, the Advertisement Selection Component 240 uses triggering on individual platforms or combinations of platforms to identify advertising opportunities. In an exemplary embodiment, the act of a subscriber dialing a particular number triggers an advertising opportunity. The term "advertising opportunity" as used herein refers to subscriber behavior that may potentially be associated with advertisements. For example, when the subscriber dials a pizza parlor, a pizza advertisement opportunity may be triggered. The SBM 100 may then respond to this trigger by delivering pizza advertisements on one or more of the available platforms in the multi-platform system. The response to the trigger may be immediate or it may respond after a delay. In addition, when triggers are used on a combination of two or more platforms, the order of execution of the triggers may be significant. Thus, in one embodiment, a first trigger associated with an advertising opportunity is configured to activate upon the detection of a first subscriber usage pattern on a first platform. Then, once that first subscriber usage pattern is detected, a second trigger is created and associated with the same advertisement opportunity. The second trigger activates upon the detection of a second subscriber usage pattern on a second platform. Finally, once the second trigger is activated, the advertisement opportunity may be offered to one or more advertisers. It should be noted that this example may be extended to any number of triggers, thus creating chains of detection and activation on the multi-platform system. Also, triggers may be customized based on information from their predecessor trigger. For example, a first trigger may activate when the subscriber clicks on a banner advertisement on a web page accessed through the Internet platform. The content of the banner advertisement may then be used to create a second trigger to be activated on the telephone platform. Moreover, the advertisement opportunity selected at the end of the chain may be uniquely associated with the chain. That is, a particular advertisement opportunity may only be selected if a specific set of triggers are activated in a particular sequence.

The Advertisement Selection Component 240 may also use triggers as the basis for notifying advertisers of opportunities and conducting auctions or sales based on those opportunities. Opportunities may be communicated with the advertiser through, for example, an advertisement opportunity message transmitted via email. The opportunities may be characterized by the triggers activated, the particular market segments describing the subscriber's platform usage habits, or a demographic profile associated with one or more subscribers. In addition, in some embodiments, each opportunity may be associated with a cost value which indicates the price associated with presenting an advertisement based on the opportunity. The advertisements may be priced, for example, based on a correlation between the subscriber characterization and the content of the advertisement. The Advertisement Selection Component 240 may also use behavioral triggers to identify market segments and to create opportunities for the creation of new market segments. For example, television and internet triggers may be used to identify viewers of certain sports programs that also access a particular news web site. Those users may form a useful and potentially large market segment, and the cable operator may be able to find a buyer for advertisements for that market segment.

In some embodiments, the information gathered by the Advertisement Selection Component 240 chooses advertisements for businesses or services based on the user's location or the location associated with content accessed by the subscriber using the multi-platform system. Location information may be gathered by one or more components of the SBM 100 as the subscriber uses the multi-platform system. Once one or more subscriber usage areas are computed based on the location, they may be used to enhance advertisement selection. In some embodiments, the Advertisement Selection Component 240 chooses advertisements related to a targeted subscriber usage area. For example, if the SBM 100 discovers that the subscriber frequently uses the multi-platform system on a train, an advertisement for a coffee at a business located in the train station may be presented. Also, because the subscriber usage area provides an indication of locations where the subscriber is comfortable visiting, selection of advertisement may be localized to optimize delivery to the subscriber and increase the probability of positive response to the advertisement. For example, a subscriber may use the telephone service to order food from restaurants in a particular neighborhood. In this case, the SBM 100 may provide the subscriber with an advertisement for a restaurant in that neighborhood but that the subscriber has not ordered from in the past. The SBM 100 may also consider additional information about the subscriber's use of the multi-platform system in order to select a particular type of restaurant. In addition, the SBM 100 may provide advertisements for other non-restaurant businesses located in the same neighborhood.

The Advertisement Selection Component 240 may also determine subscriber usage areas to select advertisements for businesses and services located outside any then-existing usage area. For example, if a subscriber always patronizes businesses located no more than one mile from his or her home, an advertisement for a business located one and one half miles from the home may be selected. This process may be repeated iteratively, continually influencing the subscriber to venture outside his or her "comfort zone" to shop at new businesses.

Figure 7:
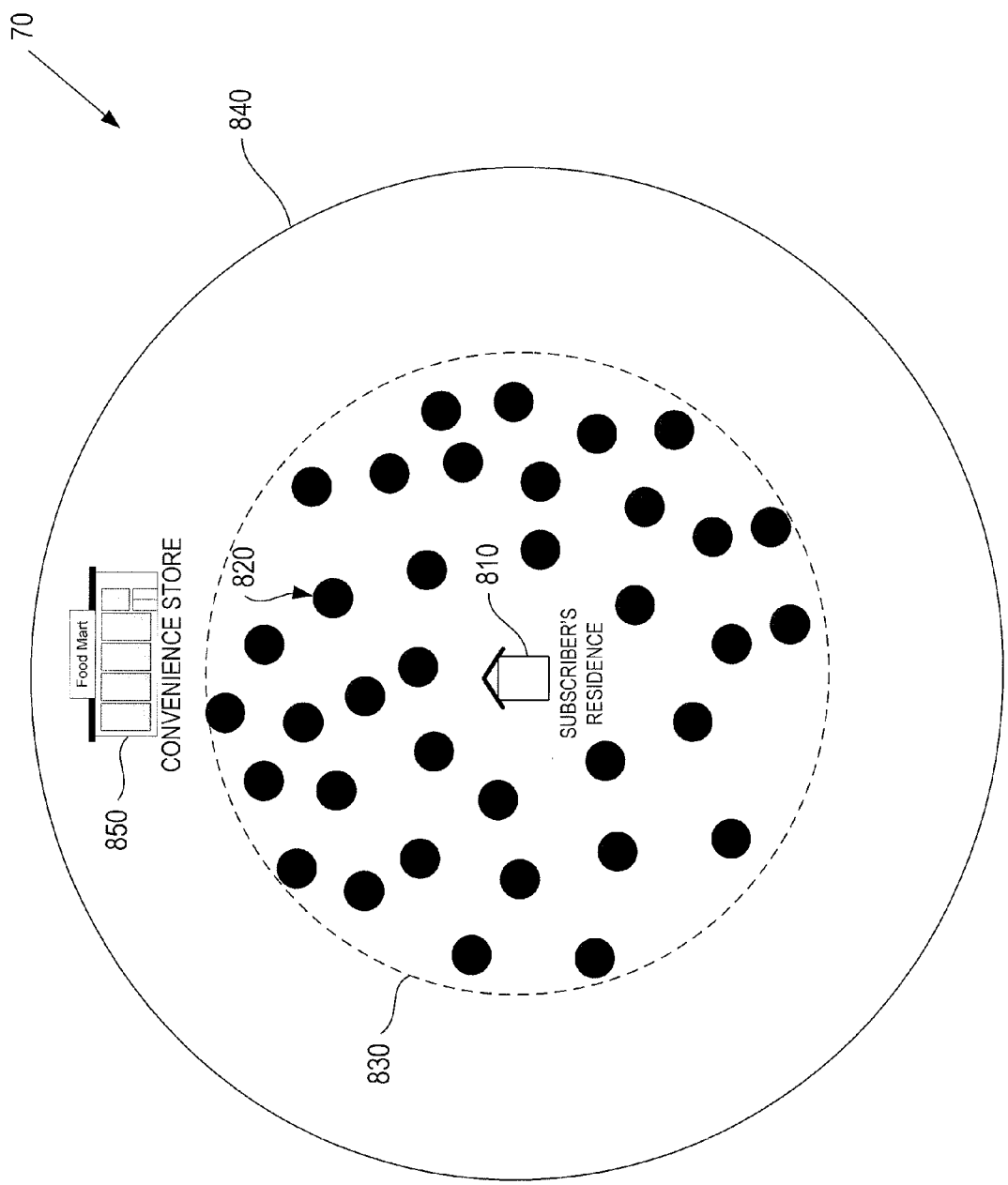
FIG. 7 illustrates an exemplary method of selecting advertisements for a subscriber based on the subscriber's past use of a multiplatform system.

FIG. 7 illustrates an exemplary method of selecting advertisements for businesses located outside of a subscriber's past usage area. In this embodiment, a target geographic area 840 is defined by the Advertisement Selection Component 240. This target geographic area may be defined as, for example, a group of street names, a town or city name, or a group of latitude and longitude values. In the embodiment 70 illustrated in FIG. 7, the target geographic area 840 is defined as a circle with a midpoint and a radius. The midpoint may be defined using any location associated with the user. In FIG. 7, for example, the subscriber's residence 810 is used as the midpoint.

Continuing with reference to FIG. 7, once the target geographic area 840 has been set, the subscriber's use of a multi-platform system is monitored over time to create a subscriber access record. This subscriber access record comprises information regarding one or more subscriber accesses to the multi-platform system. This information includes at least a location value associated with each access. It should be noted, however, that the subscriber access record may also include information such as the content types accessed by the subscriber or indicators of the behavioral habits exhibited by the subscriber when accessing the multi-platform system. In FIG. 7, black circles 820 are used to denote a location associated with an item in the subscriber access record. Based on the location values contained in the subscriber access record, the SBM 100 can define a geographic area associated with the subscriber's past usage 830 of the multiplatform area. This area is referred to herein as the subscriber's "past usage area." The past usage area 830 may contain all of the location values included in the subscriber access record or the Advertisement Selection Component 240 may select a subset of the location values that are considered "local" to a particular location, for example the subscriber's residence 810.

Once the target geographic area 840 and the past usage area 830 have been selected, the Advertisement Selection Component 240 can select an advertisement for a location where the subscriber has not had a past association, as indicated by the subscriber access record. More specifically, the Advertisement Selection Component 240 can select an advertisement associated with a location within the target geographic area 840 but outside the past usage area 830. This advertisement may then be presented to the user. It should be noted that, if the subscriber responds positively to the advertisement, the past usage area 840 may be adjusted accordingly. Thus, if the SBM 100 receives a positive response to the advertisement a redefined past usage area may be created. Then, the Advertisement Selection Component 240 may select a new advertisement that is associated with a location within the target geographic area 840 and outside of the redefined past usage area This process may be repeated iteratively, further extending the subscriber's past usage area. Once the past usage area reaches, the target geographic area, the target geographic area may be extended to continue the process.

Figure 8:
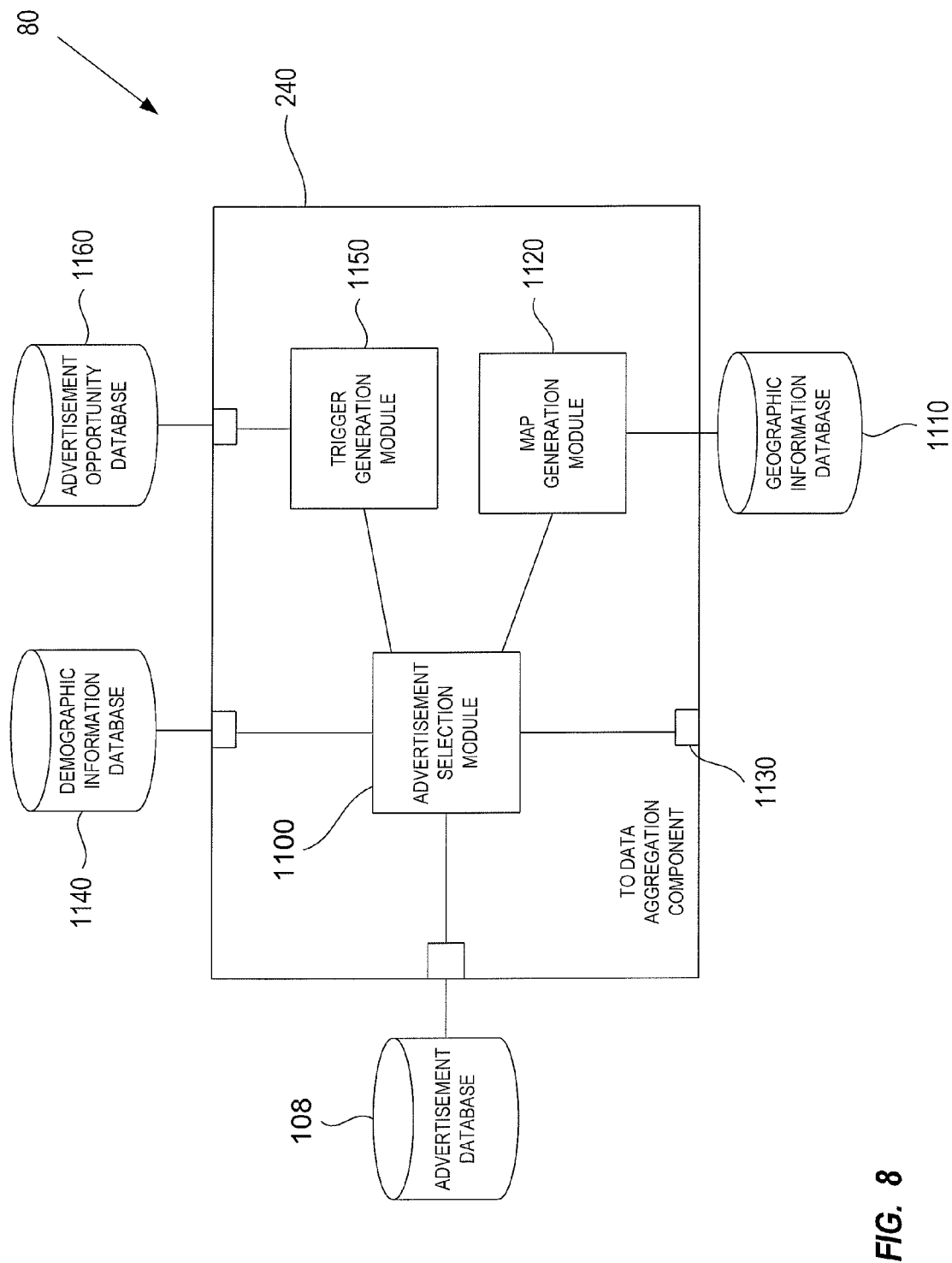
FIG. 8 provides an exemplary system diagram of an Advertisement Selection Component according to one embodiment of the present disclosure.

FIG. 8 provides one possible embodiment 80 of the Advertisement Selection Component 240. An advertisement selection module 1100 interacts with the advertisement database and a demographic information database 1140 to select advertisements for one or more subscribers. The advertisement database 108 stores one or more advertisements that may be delivered to the user thorough the multi-platform service. Information stored in the demographic information database 1140 may include, for example, the name, age, sex, location, and income of the target subscriber.

Continuing with respect to FIG. 8, the advertisement selection module 1100 communicates with a map generation module 1120. The map generation module 1120 is configured to communicate with the geographic information database 1110 to create subscriber maps based on information provided by the advertisement selection module 1100 or other components of the SBM 100. Further, the advertisement selection module 1100 may send and receive information from the data aggregation component 208 via link 1130.

FIG. 8 also illustrates the functionality used by the Advertisement Selection Component 240 to support triggers. A trigger generation module 1150 in the component 240 creates at least one platform-specific trigger associated with an advertisement opportunity. For example, the trigger generation module 1150 may create a television platform-based trigger that is associated with an opportunity to advertise to a particular demographic profile. Complex triggers may be developed using information stored in the demographic information database 1140 and the geographic information database 1110. An advertisement opportunity database 1160 stores predefined advertisement opportunities and metadata information that describes those opportunities. The metadata information in this context includes any data that may be used to describe the opportunities including, for example, advertisers associated with a particular opportunity, past use and success of the opportunity, and a set of triggers associated with a particular opportunity. For example, the database 1160 may identify a particular advertisement opportunity and, in the metadata, provide a sequence of triggers to be activated before the opportunity is deemed active.

The SBM's 100 Advertisement Verification Component 250 evaluates the subscriber's receipt and response to the advertisement. Verification can be performed using cross platform monitoring. For example, phone records can indicate access of a particular number, series of numbers, or phone usage patterns. As such, access of those numbers may provide an indication of the success of an advertising campaign. As an example, a calling card may be advertised on television over a number of weeks. The subscriber may purchase that card (e.g., through the Internet platform) and the subscriber's use of the card on the telephone platform will be verified when the subscriber calls a particular number to activate the card. Similarly, by correlating Internet browsing history with television advertisement placement, the system may determine whether the subscriber reacted to the television advertisement by visiting a specific site or issuing a search query using keywords related to the television advertisement.

In one embodiment, the Advertisement Verification Component 250 will evaluate the success of a particular advertisement or advertising campaign by considering the degree to which the targeted subscriber's behavior was modified. For example, consider an advertisement for a particular news website. Following presentment of the advertisement to the subscriber, the Advertisement Verification Component 250 may determine that the subscriber began accessing the site during each Internet session. Moreover, over later sessions, the Component 250 may ascertain that the subscriber always accesses the advertised news site first, before accessing any other site via the Internet platform. In this case, the advertisement may be considered highly effective.

In another exemplary embodiment, the Advertisement Verification Component 250 uses cross-platform correlations to enhance the process of evaluating the success of a particular advertisement or advertising campaign. Working with other components of the SBM 100, an advertisement is delivered over one of the platforms included in the multi-platform service. This advertisement may be targeted to an individual subscriber, a member of a particular household, or to a particular community. Next, the Advertisement Verification Component 250 selects monitoring criteria based on the presented advertisement. In some embodiments, the monitoring criteria are selected based on the operational characteristics of a particular platform. For example, monitoring criteria associated with the Internet platform may include, without limitation, the type of files requested, how frequently files are requested, and the inbound link used by the subscriber to access a particular file.

Once the Advertisement Verification Component 250 establishes the monitoring criteria, it may examine the subscriber's use of the multiplatform system to determine if the subscriber exhibits any behavior commensurate with the criteria. If the Advertisement Verification Component 250 detects such behavior, it may record the advertisement as "successful" in a subscriber access event database 1230. The advertisement is considered "successful" because the subscriber reacted to the targeted advertisement with the response desired by the advertiser. In addition, the Advertisement Verification Component 250 may report the behavior to another component of the SBM 100, to a computer system external to the SBM, to a human operator of the SBM 100, or another computer system.

Figure 9:
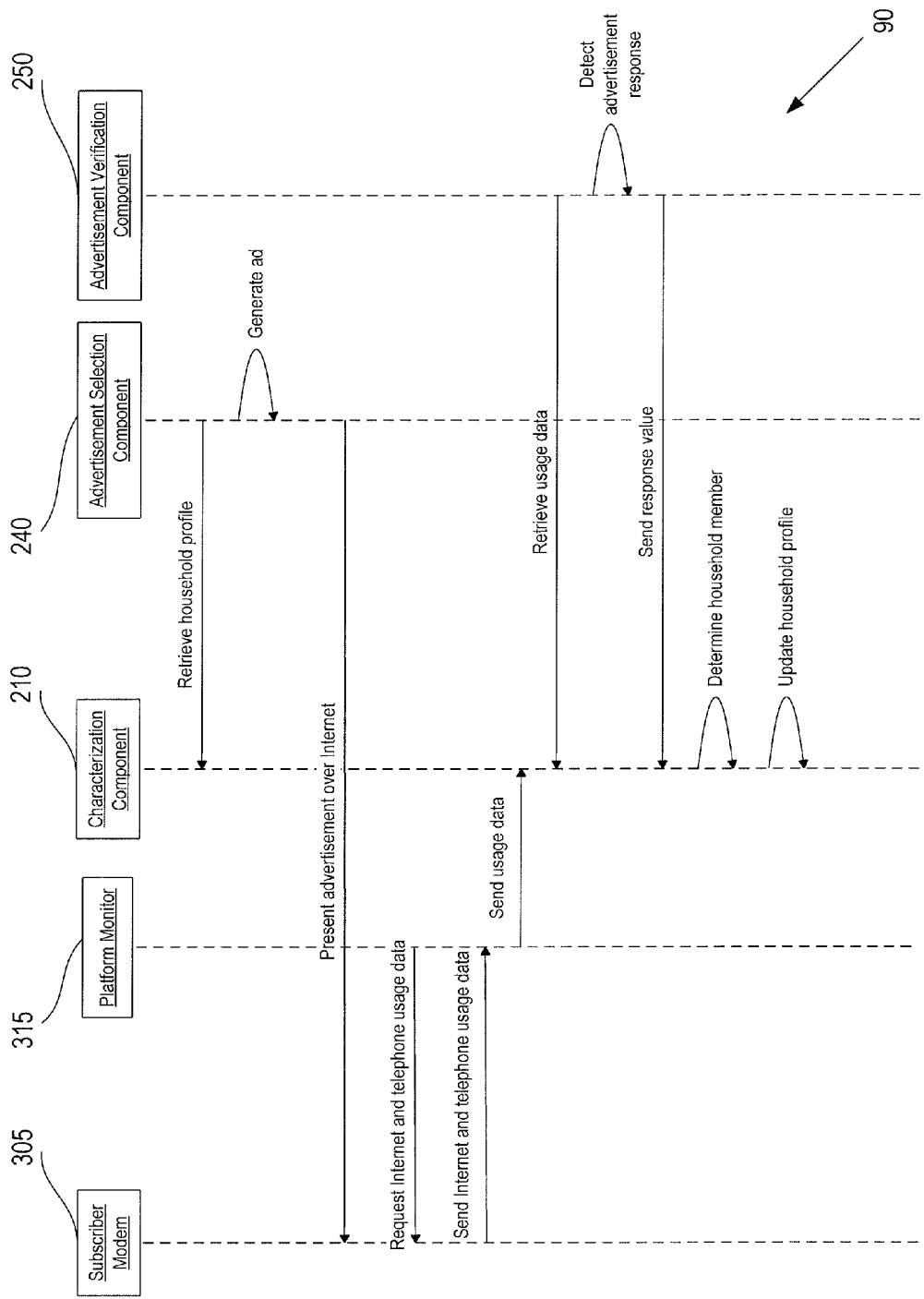
FIG. 9 is a sequence diagram illustrating an exemplary process of selecting and verifying an advertisement for a subscriber of a multi-platform service.

FIG. 9 presents an exemplary embodiment 90 of the interaction of the Advertisement Verification Component 250 with other components in the SBM 100 and with a subscriber modem 305. The Advertisement Selection Component 240 retrieves a subscriber household profile from the Subscriber Characterization Component 210. Based on this profile, the Advertisement Selection Computer 240 generates an advertisement and presents it over the Internet platform to the subscriber via the Subscriber Modem 305. Next, the Platform Monitors 315 retrieve subscriber usage data from the Subscriber Modem 305 and send it to the Characterization Component 210. The subscriber usage data may then be retrieved by the Advertisement Verification Component 250. Based on the usage data, the Advertisement Verification Component 250 detects an advertisement response and sends an indicator of that response to the Characterization Component 210. Based on the response indicator, the Characterization Component 210 may determine which household member is associated with the response. Further, the Characterization Component 210 updates a household profile based on the indicator value and any household member information derived from the indicator.

Figure 10:
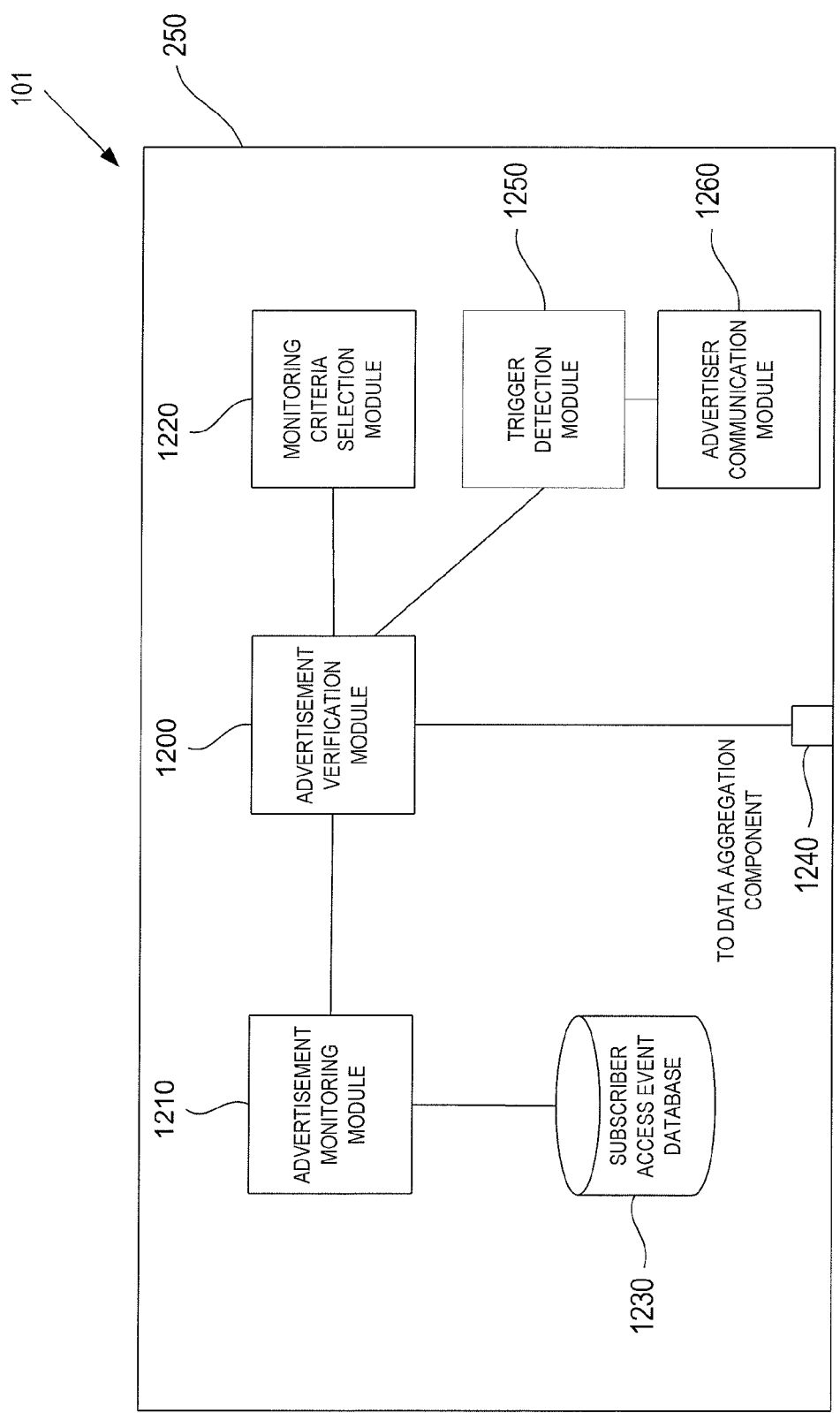
FIG. 10 provides an exemplary system diagram of an Advertisement Verification Component according to one embodiment of the present disclosure.

FIG. 10 provides an illustration of one embodiment 1000 of the Advertisement Verification Component 250. The term verification, as used herein, refers to the receipt of subscriber data in response to the presentment of an advertisement to the subscriber. An advertisement verification module 1200 is configured to verify presentment of the advertisement based on communication with a monitoring criteria selection module 1220 and the advertisement monitoring module 1210. The monitoring criteria selection module 1220 is configured to generate one or more monitoring criteria for verifying presentment of an advertisement on the multi-platform system. The advertisement monitoring module 1210 is configured to individually monitor subscriber activity with respect to the advertisement. This module 1210 further communicates with a subscriber access event database 1230 which stores data associated with subscriber activity with respect to presented advertisements. Thus, as subscriber data related to the presentment of advertisements is gathered, it is stored in the database and possibly sent to the advertisement verification module for further processing. Although this may add some redundancy in some embodiments, maintaining a database of historical data allows the Monitoring Criteria Selection Module 1220 to develop enhanced criteria for monitoring an advertisement. In addition, the database 1230 may also be used by the advertisement verification module 1200 to develop enhanced verification techniques.

The embodiment 101 depicted in FIG. 10 also shows modules used to support trigger-based advertisements. A trigger detection module 1250 communicates with the advertisement verification module 1200 to receive, through port 1240, aggregated data describing the subscriber use of the multi-platform. The trigger detection module 1250 is configured to analyze the aggregated data and detect the activation of platform-specific and cross-platform advertisement opportunities. An advertiser communication module 1260 presents these advertisement opportunities to advertisers. The advertiser communication module 1260 may use any communication technique known in the art. In one exemplary embodiment, an advertisement communication message is created by the advertiser communication module 1260 using standard email protocols. Then, the message is sent by the communication module 1260, via email, to one or more potential advertisers.

Figure 11:
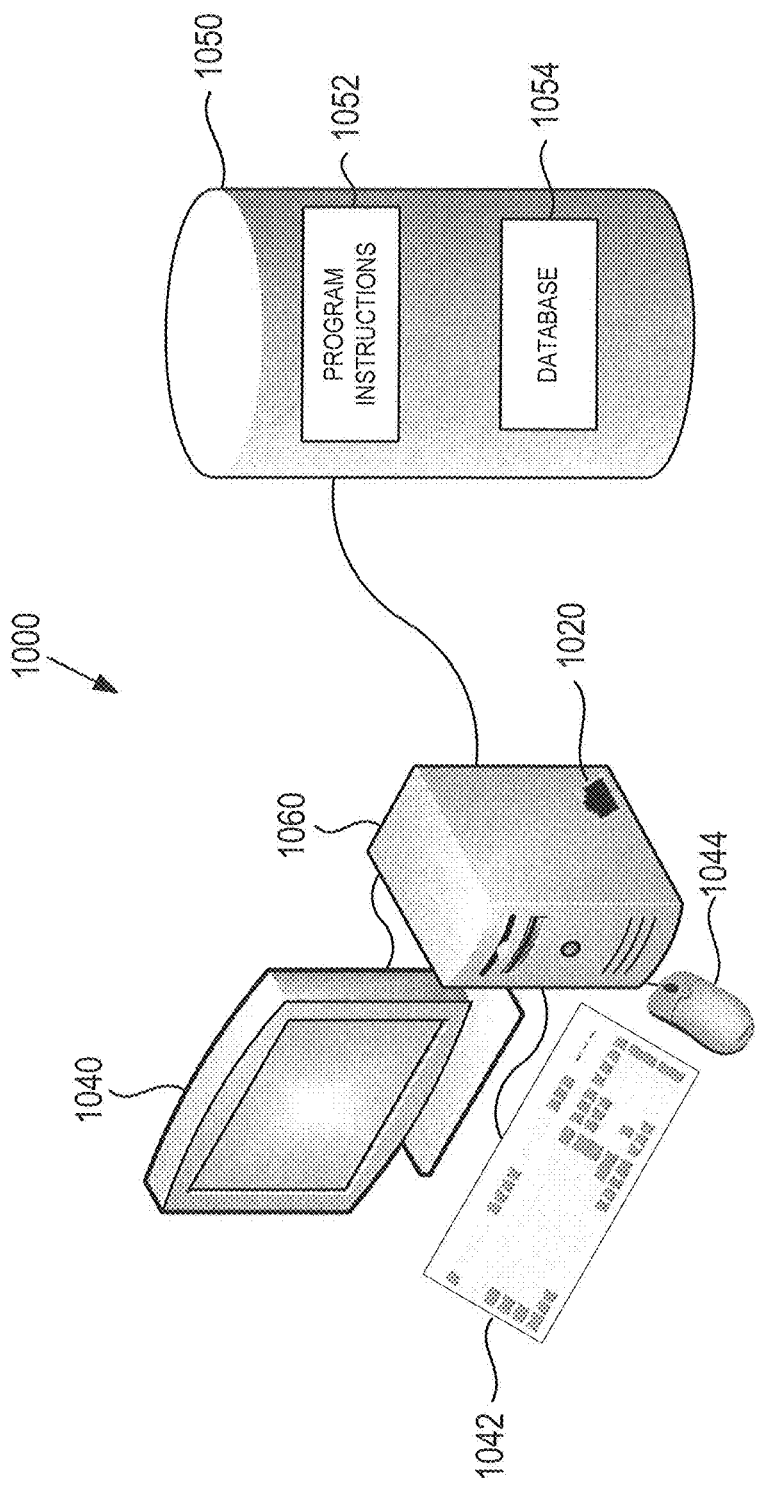
FIG. 11 is a block of a computer system for realization of the multi-platform targeted advertising system of FIG. 1.

FIG. 11 is a block diagram illustrating a computer system 1000 for realization of a computer-implemented apparatus that may form all or a portion of one or more implementation(s) or embodiment(s) of the present disclosure. The computer system 1000 includes a computer 1060, a keyboard 1042, a mouse 1044, and a display device (e.g., computer monitor) 1040 through which the computer 1060 may receive input/provide output, for example to a user, operator or another computer or system (not shown). Input/output devices such as the display device 1040, keyboard 1042, the mouse 1044, and other means or mechanisms (e.g., touch screen interface) through which interaction with the computer system 1000 may occur are generally known in the art, and a detailed discussion thereof is omitted here for convenience only and should not be considered limiting. The computer 1060 includes a network port 1020 for connecting the computer to an internal or external network, such as, for example the network 110. The computer 1060 is connected to a storage device 1050 that includes program instructions 1052 for software application(s) that provides the logical functions of the computer-implemented apparatus and/or method(s) of the present disclosure. The storage device 1050 also contains a database 1054 for storing data.

Those skilled in the art will recognize that the program instructions 1052 for software applications implementing all or a portion of one or more embodiment(s) of the present disclosure may be written in a programming language such as Java or C++, and that the database 1054 may be implemented with a database package such as Microsoft Access™ or a database management system (DBMS) such as Microsoft SQL Server™, Microsoft SQL Server CE™, IBM DB2™, mySQL or postgreSQL.

Figure 12:
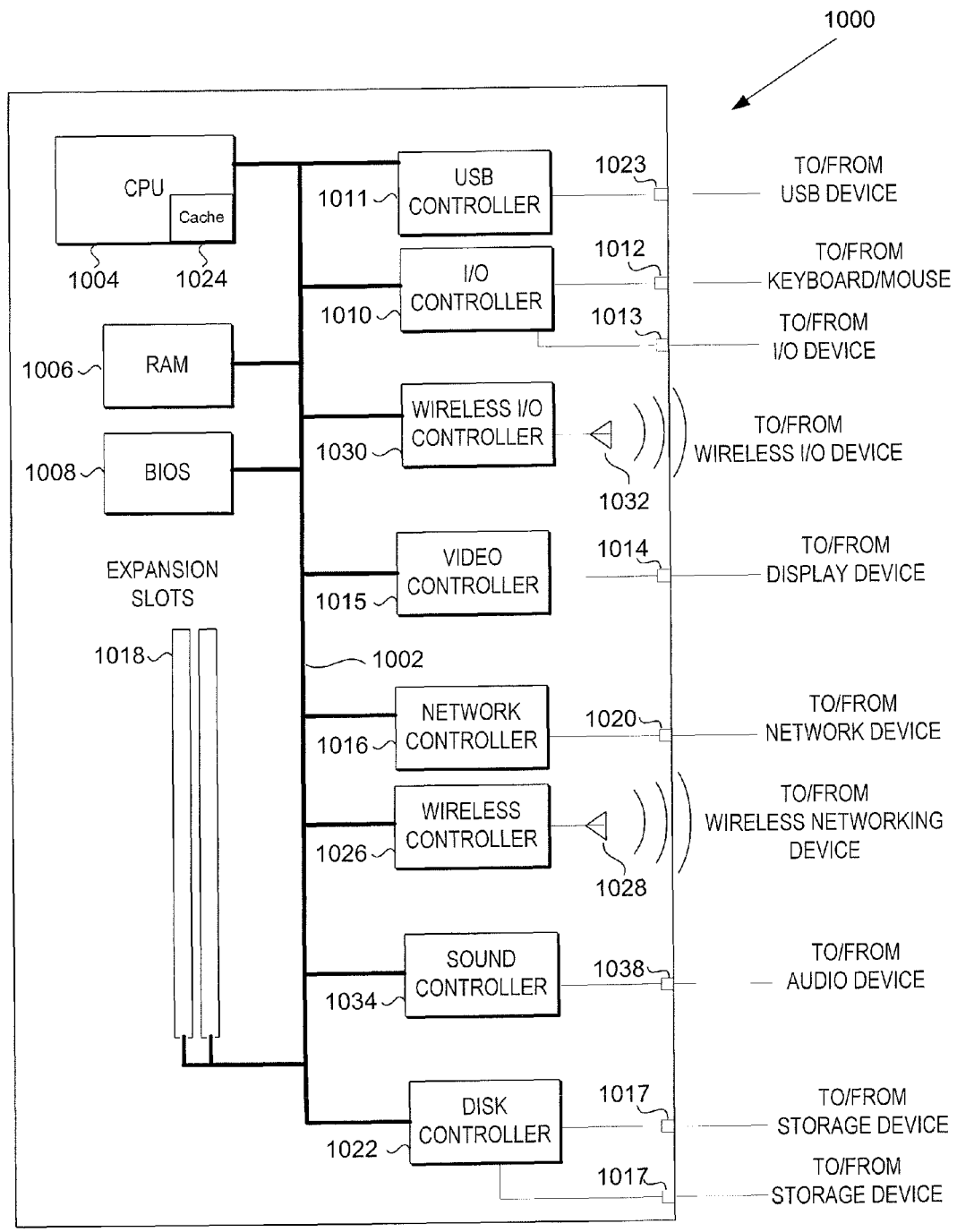
FIG. 12 is a block of a computer system for realization of the multi-platform targeted advertising system of FIG. 1.

FIG. 12 is a block diagram illustrating a computer architecture of the system 1000 through which the embodiments of the SBM 100, including components 202, 204, 206, 208, 210, 220, 230, 240, and 250, may be implemented. A system bus 1002 transports data amongst the Central Processing Unit (CPU) 1004, RAM 1006, the Basic Input Output System (BIOS) 1008 and other components. The CPU 1004 may include a cache memory component 1024. The computer system 1000 may include one or more external storage ports 1017 for accessing a hard disk drive (HDD), optical storage drive (e.g., CD-ROM, DVD-ROM, DVD-RW), flash memory, tape device, or other storage device (not shown). The relevant storage device(s) are connected through the external storage port 1017 which is connected to the system bus 1002 via a disk controller 1022. A keyboard and/or pointing device (e.g., mouse, touch pad) (see FIG. 11) can be connected to the keyboard/mouse port(s) 1012, and other I/O devices could be connected to additional I/O port(s) 1013, which are connected to the system bus 1002 through the I/O controller 1005. Additional ports or devices, such as serial ports, parallel ports, firewire adapters, or biometric devices (not shown), may be utilized through the I/O controller 1010. A display device (see FIG. 11) can be connected to a display device port 1014 which is connected to the system bus 1002 through the video controller 1015. A network device (not shown), including but not limited to an Ethernet device or other device having networking capability, can be connected to a network port 1020 which is connected through the network controller 1016 to the system bus 1002. The computer system 1000 may be wirelessly connected to a network device that is configured for wireless operation (not shown), including but not limited to wireless routers, using an antenna 1028 connected to a wireless controller 1026 connected to the system bus 1002, where the antenna transmits/receives signals to/from the network device. The computer system 1000 may include one or more USB ports 1023. A USB device (not shown), including but not limited to a printer, scanner, keyboard, mouse, digital camera, storage device, PDA, cellular phone, biometric device, webcam, and I/O adapters can be connected to the USB port 1023 which is connected to the system bus 1002 through the USB controller 1011. Other devices, such as cellular phones, PDAs, and other portable devices may also be connected wirelessly via a wireless I/O antenna 1032 that is connected to a wireless I/O controller 1030. Examples of wireless I/O technologies include, but are not limited to, Bluetooth, Infrared (IR), and Radio-Frequency (RF). Audio devices, such as microphones, speakers, or headphones may be connected to a sound port 1038 that is connected to a sound controller 1034 that is connected to the system bus 1002. Expansion slots 1018 can include Industry Standard Architecture (ISA) slots, Peripheral Component Interconnect (PCI) expansion slots, PCI Express expansion slots, Accelerated Graphics Port (AGP) slots or any other slot generally known in the art to allow additional cards to be placed into the computer system 1000. These slots can be used to connect network cards, video cards, sound cards, modems and any other peripheral devices generally used with a computer. The computer system 1000 also includes a source of power (not shown), including but not limited to a power supply connected to an external source of power, and/or an internal or external battery. These devices are generally well-know to those skilled in the art, and a detailed discussion thereof is omitted here for convenience only and should not be considered limiting.

The embodiments of the present disclosure may be implemented with any combination of hardware and software. If implemented as a computer-implemented apparatus, the present disclosure is implemented using means for performing all of the steps and functions described above.

The embodiments of the present disclosure can be included in an article of manufacture (e.g., one or more computer program products) having, for instance, computer useable or computer readable media. The media has embodied therein, for instance, computer readable program code means, including computer-executable instructions, for providing and facilitating the mechanisms of the embodiments of the present disclosure. The article of manufacture can be included as part of a computer system or sold separately.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of the present disclosure is not limited to the particular examples and implementations disclosed herein, but is intended to cover modifications within the spirit and scope thereof as defined by the appended claims and any and all equivalents thereof.

The invention claimed is:

1. A computer-implemented method of creating a subscriber profile based on a subscriber's use of a multi-platform system, wherein the multi-platform system comprises a plurality of telecommunication platforms, each capable of being accessed by a subscriber over a single transmission medium, the method comprising:

sending, by a central computer, a first data request to a first computer, wherein the first computer is configured to monitor data transmitted over a first telecommunication platform;

sending, by the central computer, a second data request to a second computer, wherein the second computer is configured to monitor data transmitted over a plurality of other telecommunication platforms;

receiving, by the central computer, a first data log indicative of the subscriber's use of the first telecommunication platform;

receiving, by the central computer, a second data log indicative of the subscriber's use of at least one of the plurality of other telecommunication platforms;

correlating, by the central computer, the first data log and the second data log to detect at least one subscriber access pattern, wherein the at least one subscriber access pattern is indicative of a repeated sequence of subscriber interactions with the first computer and the second computer; and applying, by the central computer, the at least one subscriber access pattern to forecast subscriber behavior over the plurality of telecommunications platforms, wherein the subscriber behavior includes a next URL (Uniform Resource Locator) accessed over an Internet platform, a next channel accessed over a television platform, a time for a next channel change on the television platform, a viewing duration of the television platform by the subscriber, and an interaction duration with the Internet platform by the subscriber.

2. The method of claim 1, wherein the first computer is a television set-top box and the first telecommunication platform provides television service.

3. The method of claim 2, wherein the plurality of other telecommunication platforms provides at least an Internet service and a telephone service.

4. The method of claim 1, further comprising:
selecting, at the central computer, an advertisement using the forecasted subscriber behavior.

5. The method of claim 4, further comprising:
sending, by the central computer, the advertisement to the first computer over the transmission medium; and
presenting, by the first computer, the advertisement over the first telecommunication platform.

6. The method of claim 4, further comprising:
sending, by the central computer, the advertisement to the second computer over the transmission medium; and
presenting, by the second computer, the advertisement over the second telecommunication platform.

7. The method of claim 1, wherein the first computer is a mobile device.

8. The method of claim 1, wherein the second computer is a mobile device.

9. A computer-implemented method of creating a household profile based on a household's use of a multi-platform system, wherein the multi-platform system comprises a plurality of telecommunication platforms, each capable of being accessed by the household over a single transmission medium, the method comprising:
sending, from a central computer, a plurality of data requests to a plurality of computers associated with the household, wherein each of the computers is configured to monitor data transmitted over at least one of the telecommunications platforms;
receiving, at a central computer, a plurality of data logs, wherein each data log is indicative of the household's use of a respective one of the telecommunications platforms;
detecting, at the central computer, a plurality of content types associated with the data in the plurality of data logs, wherein the plurality of content types includes a category of the one or more content types, keywords associated with the one or more content types, the format of the one or more content types, and the telecommunication platform used to access the one or more content types;
detecting, at the central computer, one or more access patterns within the plurality of data logs, wherein the one or more access patterns are identified by device of access, device attributes, frequency of access, duration of access, location of access, time of access, day of access, date of access, type of access and the telecommunication platform of access;
retrieving, at the central computer, demographic data stored in a demographic database communicatively coupled to the central computer; and
correlating, at the central computer, the plurality of content types, the one or more access patterns, and the demographic data to forecast household behavior over the plurality of telecommunications platforms, wherein the household behavior includes a next URL (Uniform Resource Locator) accessed over an Internet platform, a next channel accessed over a television platform, a time for a next channel change on the television platform, a viewing duration of the television platform, and an interaction duration with the Internet platform.

10. The method of claim 9, further comprising:
selecting, by the central computer, an advertisement for the subscriber household using the forecasted household behavior; and
presenting the advertisement to the subscriber household using at least one of the plurality of telecommunication platforms.

11. The method of claim 10, further comprising:
detecting, by the central computer, a response value associated with the presented advertisement;
deriving, by the central computer, subscriber household member information based at least on the response value; and
updating, by the central computer, the forecasted household behavior based on the response value and the subscriber household member information.

12. The method of claim 9, further comprising:
identifying, by the central computer, at least one market segment behavior based on the forecasted household behavior; and
assigning, by the central computer, the subscriber household to at least one market segment based on the at least one market segment behavior.

13. The method of claim 12, further comprising:
sending, by the central computer, an advertisement opportunity message to at least one advertiser, wherein the advertisement opportunity message is commensurate with at least one of the assigned market segments.

14. The computer-implemented method of claim 1, wherein the first data log includes a category of one or more content types, keywords associated with the one or more content types, the format of the one or more content types, and the telecommunication platform used to access the one or more content types.

15. The computer-implemented method of claim 1, wherein the second data log includes device of access, device attributes, frequency of access, duration of access, location of access, time of access, day of access, date of access, type of access and the telecommunication platform of access.

16. A computer-implemented method of creating a subscriber profile based on a subscriber's use of a multi-platform system, wherein the multi-platform system comprises a plurality of telecommunication platforms, each capable of being accessed by a subscriber over a single transmission medium, the method comprising:
collecting usage data of the subscriber from the plurality of telecommunications platforms;
identifying one or more content types of the usage data wherein the one or more content types includes a category of the one or more content types, keywords associated with the one or more content types, the format of the one or more content types, and the telecommunication platform used to access the one or more content types;
identifying one or more access patterns within the usage data wherein the one or more access patterns are identified by device of access, device attributes, frequency of access, duration of access, location of access, time of access, day of access, date of access, type of access and the telecommunication platform of access; and
correlating the one or more content types and the one or more access patterns across the plurality of telecommunications platforms to forecast subscriber behavior over the plurality of telecommunications platforms, wherein the subscriber behavior includes a next URL (Uniform Resource Locator) accessed over an Internet platform, a next channel accessed over a television platform, a time for a next channel change on the television platform, a viewing duration of the television platform by the subscriber, and an interaction duration with the Internet platform by the subscriber.

17. The computer-implemented method of claim 16, further comprising:
   selecting an advertisement based upon the forecasted subscriber behavior; and
   displaying the advertisement on at least one platform of the plurality of telecommunications platforms.

* * * * *